(12) United States Patent
Barker et al.

(10) Patent No.: US 7,883,580 B2
(45) Date of Patent: Feb. 8, 2011

(54) SYSTEM AND METHOD FOR NANOTUBE GROWTH VIA ION IMPLANTATION USING A CATALYTIC TRANSMEMBRANE

(75) Inventors: Delmar L. Barker, Tucson, AZ (US); Mead M. Jordan, Tucson, AZ (US); W. Howard Poisl, Tucson, AZ (US)

(73) Assignee: Raythedn Company, Waltham, MA (US)

( * ) Notice: Subject to any disclaimer, the term of this patent is extended or adjusted under 35 U.S.C. 154(b) by 456 days.

(21) Appl. No.: 12/061,317

(22) Filed: Apr. 2, 2008

(65) Prior Publication Data

US 2009/0252886 A1    Oct. 8, 2009

(51) Int. Cl.
C23C 16/00     (2006.01)
C23C 16/448    (2006.01)

(52) U.S. Cl. .................................. 118/715; 977/844
(58) Field of Classification Search .............. 118/715; 977/844
See application file for complete search history.

(56) References Cited

U.S. PATENT DOCUMENTS

2009/0252886 A1*  10/2009  Barker et al. ............... 427/523
2009/0252887 A1*  10/2009  Barker et al. ............... 427/523

OTHER PUBLICATIONS

Tanemura et al., Synthesis of carbon nanotubes using hydrocarbon ion beams, Advanced Materials Research, vols. 11-12 (2006), 547.

Tanemura et al., Direct growth of single carbon nanofiber onto tip of scanning probe microscopy induced by ion irradiation, Japanese J. of Appl.Phys, vol. 45, No. 3, 2004-2008.

Daenen et al., The wonderous world of carbon nanotubes, Eindhoven University of Technology, Feb. 27, 2003, pp. 1-23.

Striemer et al., Charge- and size-based separation of macromolecules using ultrathin silicon memranes, 2007 Nature Publishing Group, pp. 749-753.

Wang et al., Catalytic synthesis of carbon nanotubes under ion irradiation, Letters to the Editors, Carbon 43 (2005) 447-450.

Babonneau et al., Morphology of encapsulated iron nanoparticles obtained by co-sputtering and implantation: a GISAXS study, J. Appl. Cryst. (2000) 33, 437-441.

Adhikari et al., Ion-implantation-prepared catalyst nanoparticles for growth of carbon nanotubes, Applied Physics Letters 86, 053104 (2005), pp. 86-88.

Kotakoski et al., B and N. implantation into carbon nanotubes: Insight from atomistic simulations, Physical Review B 71, (2005), 205408-1-205408-6.

(Continued)

*Primary Examiner*—Jeffrie R Lund
(74) *Attorney, Agent, or Firm*—Eric A. Gifford

(57) ABSTRACT

Ion implantation is used to grow nanotubes out of carbon and other materials. Catalytic material is placed on or in a membrane that physically and possibly environmentally separates an implantation chamber or region from a growth chamber or region. High-energy ions are implanted into the catalytic material from one side to grow nanotubes on an exposed surface in the growth chamber. Ion implantation via the membrane provides for greater flexibility to separate and independently control the implantation and growth processes.

18 Claims, 16 Drawing Sheets

OTHER PUBLICATIONS

Rodriguez-Manzo et al., In situ nucleation of carbon nanotubes by the injection of carbon atoms into metal particles, Nature Nanotechnology, vol. 2, (May 2007)307-311.

P.M. Ajayan, Nanotubes from carbon, 1999 American Chemical Society, May 1, 1999, pp. 1787-1799.

Yamamoto et al., New method of carbon nanotube growth by ion beam irradiation, American Institute of Physics, (1996), 4174-4175.

Kaukonen et al., Atomic-scale modeling of the ion-beam-induced growth of amorphous carbon, The American Physical Society (2000), 2806-2811.

* cited by examiner

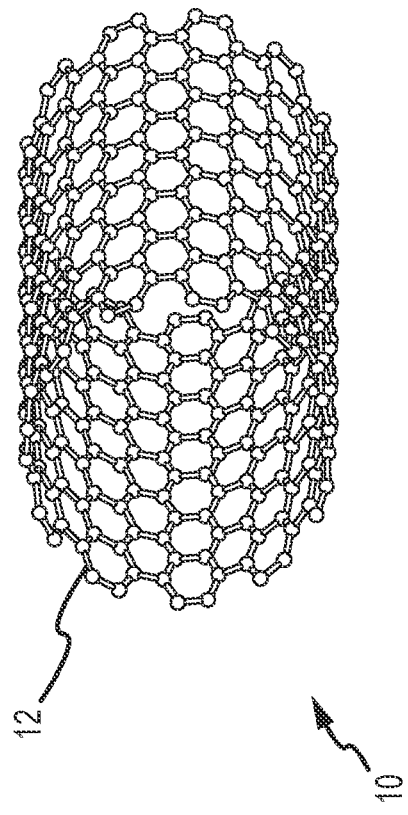
FIG. 1
(PRIOR ART)
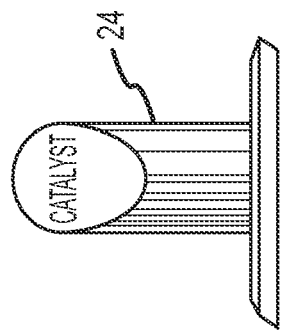
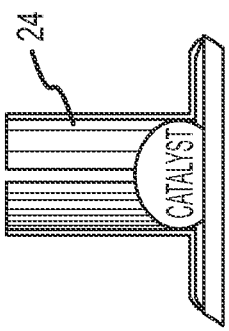
FIG. 2a
(PRIOR ART)
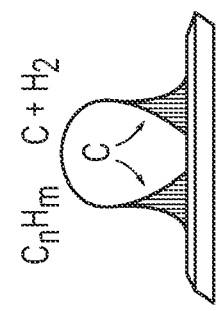
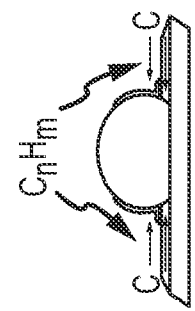
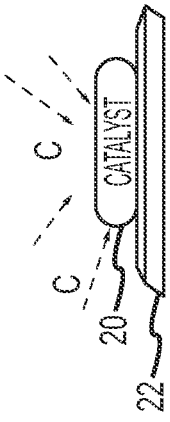
FIG. 2b
(PRIOR ART)

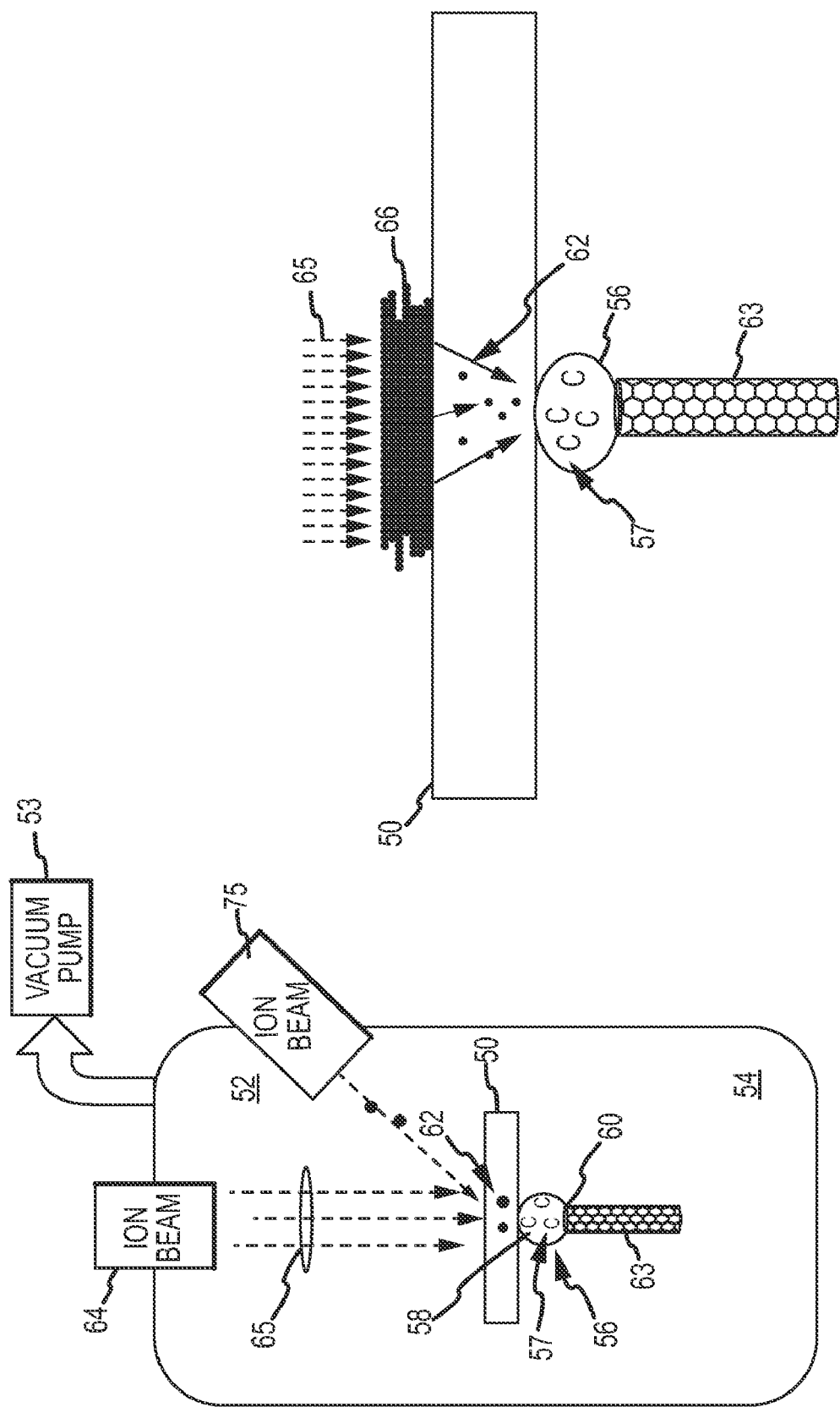

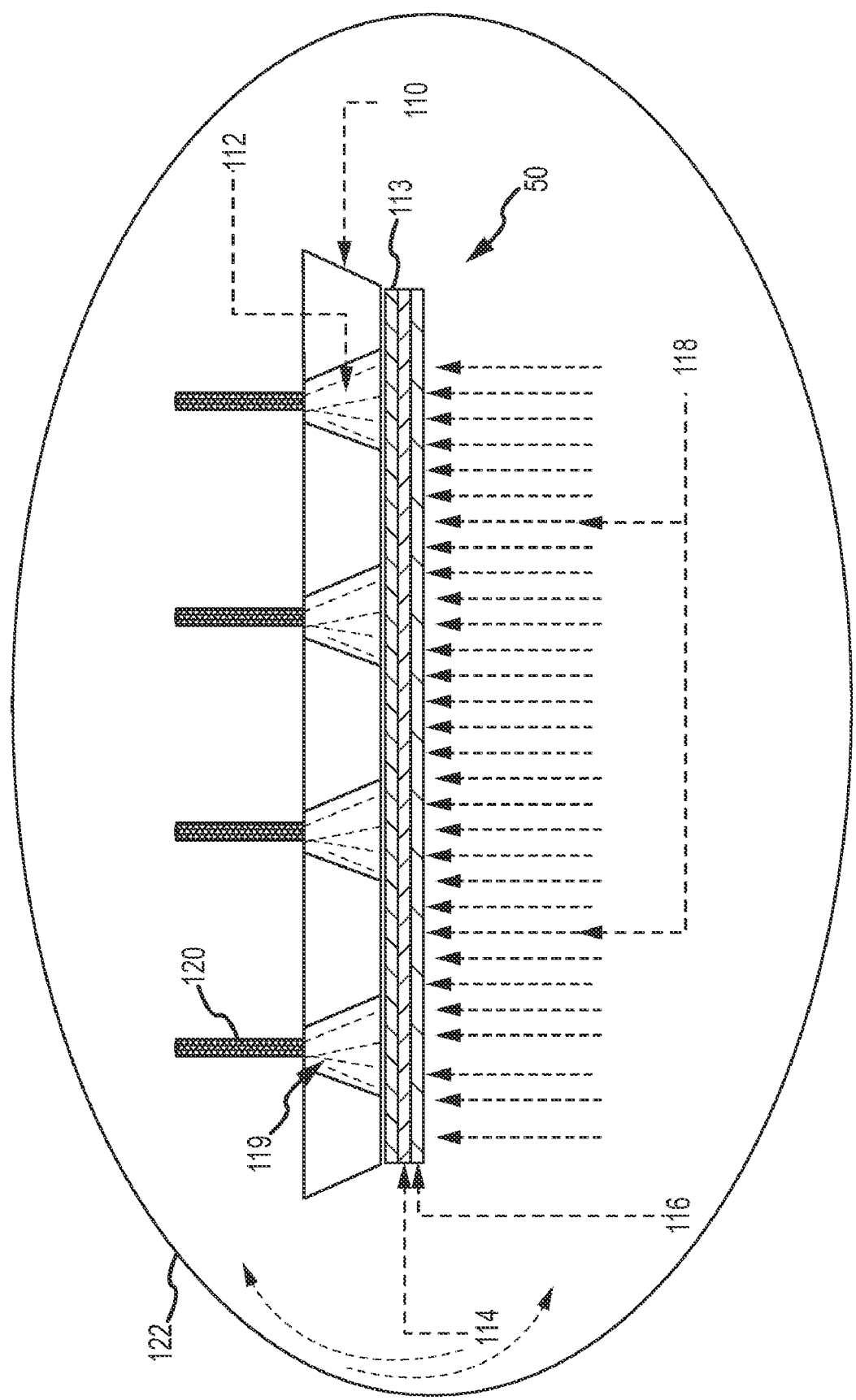

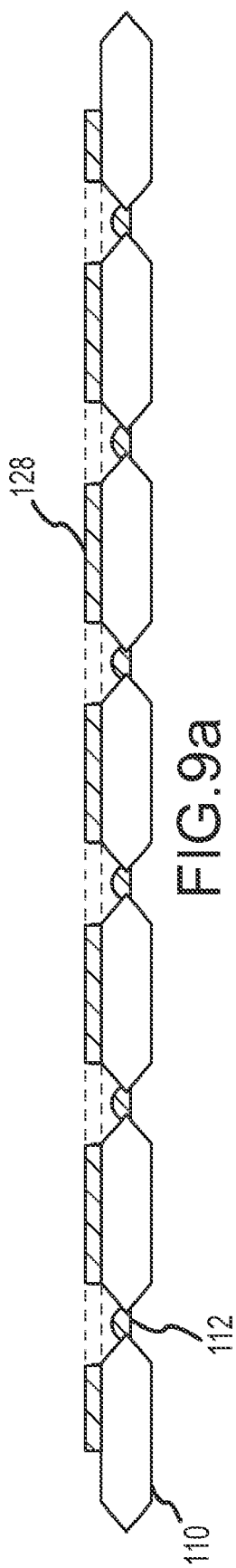
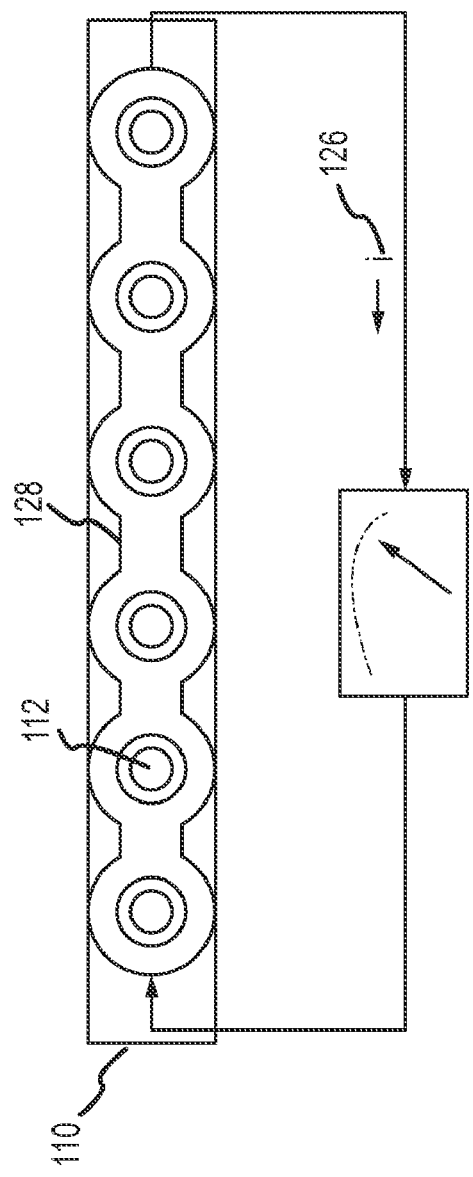

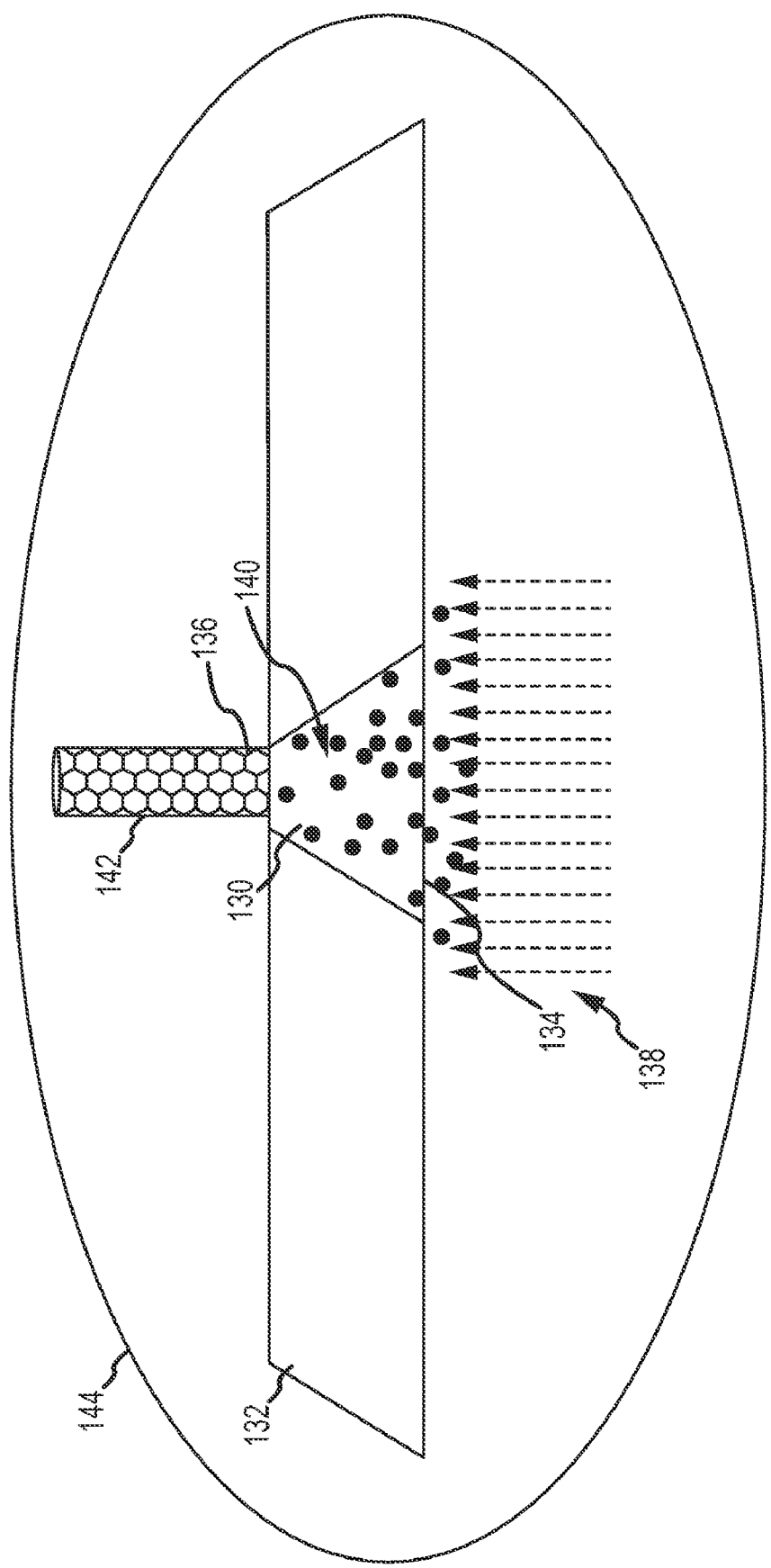

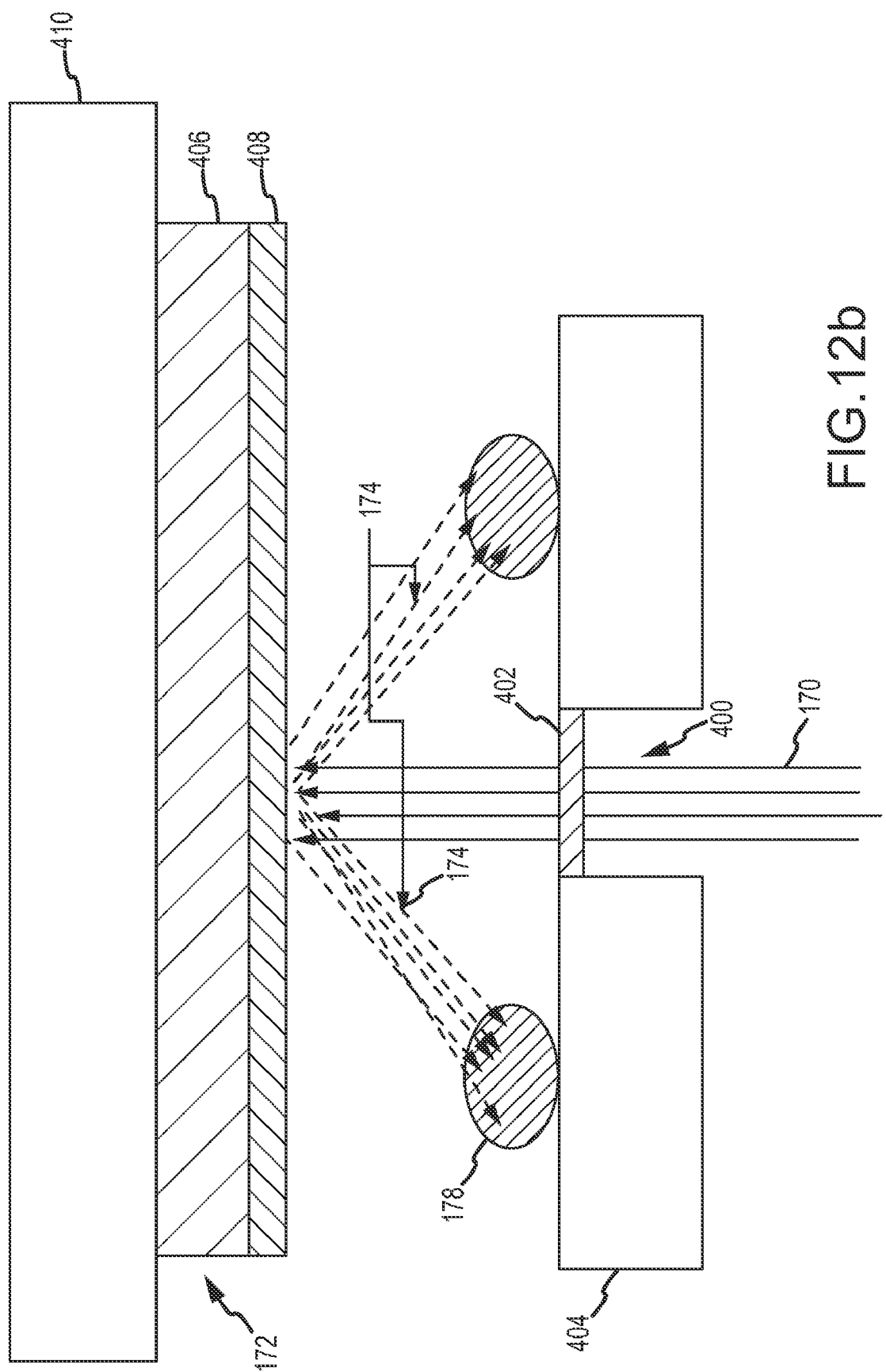

US 7,883,580 B2

SYSTEM AND METHOD FOR NANOTUBE GROWTH VIA ION IMPLANTATION USING A CATALYTIC TRANSMEMBRANE

BACKGROUND OF THE INVENTION

1. Field of the Invention

This invention relates to nanotube (NT) growth of carbon and other materials using an ion implantation process.

2. Description of Related Art

Carbon nanotubes (CNTs) have stimulated a great deal of interest in the microelectronic and other industries because of their unique properties including tensile strengths above 35 GPa, elastic modulus reaching 1 TPa, higher thermal conductivity than diamond, ability to carry 1000× the current of copper, densities below 1.3 g/cm$^3$ and high chemical, thermal and radiation stability. CNTs have great promise for devices such as field effect transistors, field emission displays, single electron transistors in the microelectronic industry, and uses in other industries. Commercialization of CNTs will depend in large part on the ability to grow and network CNTs on a large cost-effective scale without compromising these properties.

As illustrated in FIG. 1, a CNT 10 is a hollow cylindrical shaped carbon molecule. The cylindrical structure is built from a hexagonal lattice of sp$^2$ bonded carbon atoms 12 with no dangling bonds. The properties of single-walled nanotubes (SWNTs) are determined by the graphene structure in which the carbon atoms are arranged to form the cylinder. Multi-walled nanotubes (MWNTs) are made of concentric cylinders around a common central hollow.

CNTs are commonly grown using several techniques such as arc discharge, laser ablation and chemical vapour deposition (CVD). In CVD the growth of a CNT is determined by the presence of a catalyst usually a transition metal such as Fe, Co or Ni, which causes the catalytic dehydrogenation of hydrocarbons and consequently the formation of a CNT. CVD generally produces MWNTs or SWNTs of relatively poor quality due mostly to the poorly controlled diameters of the nanotubes. However, CVD is relatively easy to scale up and can be integrated with conventional microelectronic fabrication, which favors commercialization.

The way in which nanotubes are formed at the atomic scale is not precisely known. The growth mechanism is still a subject of scientific debate, and more than one mechanism might be operative during the formation of CNTs. As shown in FIGS. 2a and 2b, a catalyst 20 is deposited on a support such as silicon, zeolite, quartz, or inconel 22. At elevated temperatures, exposure to a carbon containing gas causes the catalyst to take in carbon, on either the surfaces, into the bulk, or both. This thermal diffusion process of neutral carbon atoms occurs at energies of a few electronvolts (eV). A precursor to the formation of nanotubes and fullerenes, $C_2$, is formed on the surface of the catalyst. From this precursor, a rodlike carbon 24 is formed rapidly, followed by a slow graphitization of its wall. The CNT can form either by 'extrusion' (also know as 'base growth' or 'root growth') shown in FIG. 2a, in which the CNT grows upwards from the catalyst that remains attached to the support, or the particles can detach from the substrate and move at the head of the growing nanotube, labelled 'tip-growth', as shown in FIG. 2b. Depending on the size of the catalyst particle either SWNT or MWNT are grown. A typical catalyst may contain an alloy of Fe, Co or Ni atoms having a total diameter of 1 to 100 nm (on the order of 1,000 atoms for 1 nm diameter of catalyst).

As shown in FIG. 3, to synthesize CNTs 24 using CVD the support 22 and catalytic material 20 are placed inside an environmentally-controlled chamber 32. The sample is heated until the temperature is great enough (400° C.) that the introduction of hydrogen along with a buffer gas (Argon) "reduces" (removes the oxide) the particle. A plurality of gas feeds 34 introduce a process gas including a mixture of a carbon-containing growth gas 36, typically a hydrocarbon $C_xH_y$ such as Ethylene ($C_2H_4$), Methane ($CH_4$), Ethanol ($C_2H_5OH$), or Acetylene ($C_2H_2$) or possibly a non-hydrocarbon such as carbon-monoxide (CO), an inert buffer gas 38 such Argon (Ar) to control pressure inside the chamber and prevent released hydrogen atoms from exploding and possibly a scrubber gas 40 such as $H_2O$ or $O_2$ to periodically or continuously clean the surface of the catalyst. An energy source 42 such as a heating coil provides the energy necessary (e.g. a few eV) to heat the catalyst to a temperature which allows it to 'crack' the hydrocarbon molecules into reactive atomic carbon 44. The reactive carbon 44 is absorbed into the surface of catalytic material 20 causing the CNT to grow from the same catalytic surface. A pump system 46 including a vacuum and/or pressure pump controls the pressure inside the chamber to produce conditions both conducive to absorption of carbon atoms into the catalytic material and growth of CNTs from the catalytic material. A number of electrical ports 48 are provided to accommodate pressure sensors, thermocouples and the like to monitor conditions inside the chamber.

SUMMARY OF THE INVENTION

The present invention provides a system and method for growing nanotubes out of carbon and other materials using an ion implantation process that facilitates sustained growth of high quality nanotubes.

This is accomplished by implanting ions into a catalyst to grow nanotubes. In the case of carbon nanotubes (CNTs), a catalyst is placed on or in a membrane that physically and possibly environmentally separates an implantation chamber from a growth chamber. An ion beam is used to implant carbon ions into the catalyst to grow CNTs on an opposing surface exposed to the growth chamber. The carbon ions can be implanted directly into the catalyst or indirectly via "knock on" or "sputtering" processes that amplify the number of implanted carbon ions. Ion implantation via the membrane provides for greater flexibility to separate and independently control the implantation and growth processes.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1, as described above, is a diagram of a carbon nanotube;

FIGS. 2a-2b, as described above, are diagrams illustrating root and tip CNT growth;

FIGS. 4a and 4b are diagrams of an ion implantation process through a membrane that supports the catalyst and separates the implantation and growth chambers for nanotube growth in accordance with the present invention;

FIG. 8 is a section view of an exemplary membrane including an array of catalytic nano-particles formed therein;

FIGS. 9a-9b are section and plan views of an exemplary strip heater for heating the catalyst;

FIG. 10 is a section view of a membrane for direct implantation of ions into the catalyst;

FIGS. 12a-12c are diagrams of an implantation process that sputters carbon ions from a target that are back scattered onto the catalyst;

DETAILED DESCRIPTION OF THE INVENTION

Figure 3:
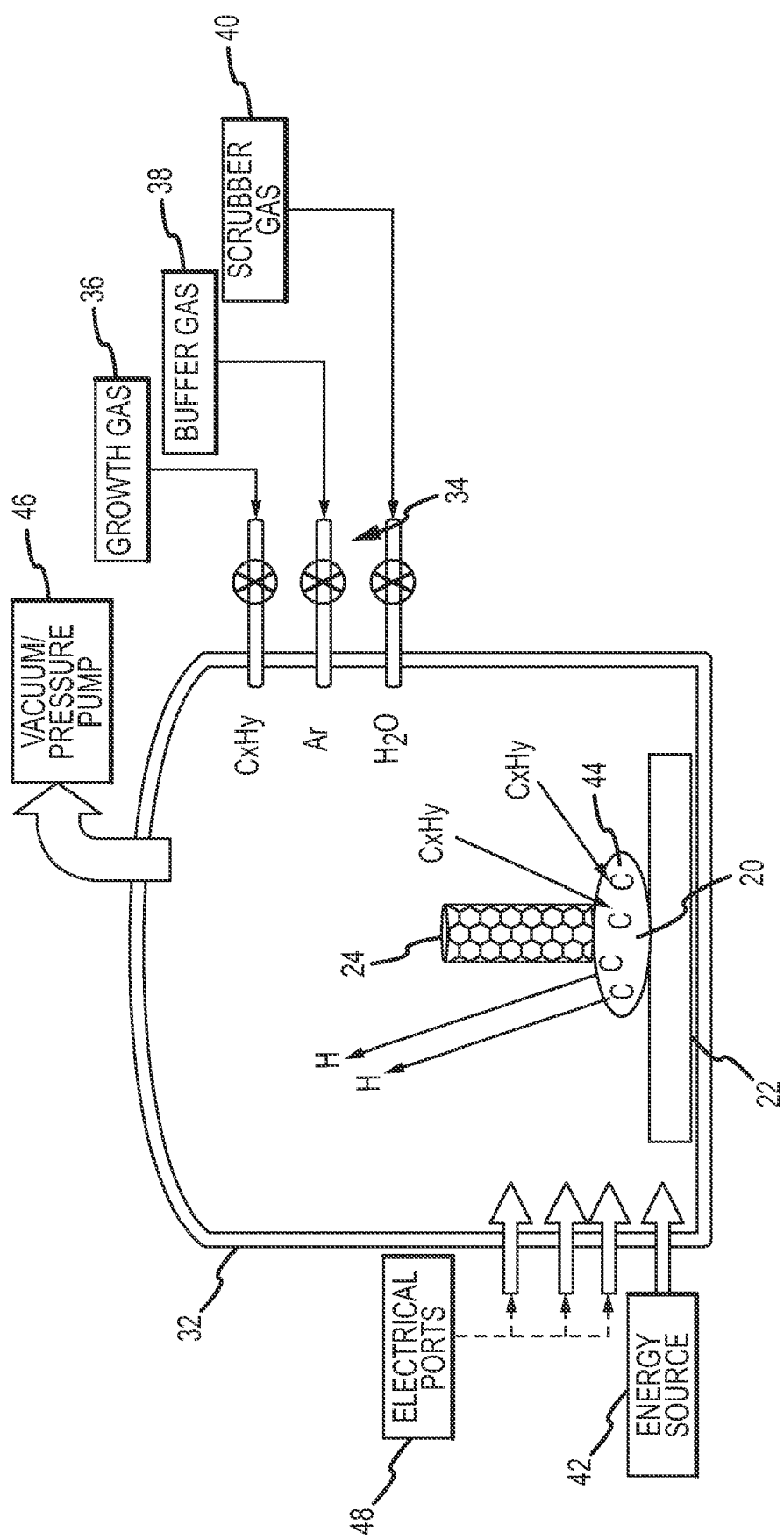
FIG. 3, as described above, is a diagram of a conventional CVD process using a single feedstock-growth chamber to grow CNTs on a substrate.

Efforts to improve the growth of CNTs have revealed a number of drawbacks in the conventional CVD approach. The surface area of the catalytic particle for absorbing carbon atoms is limited by the desired geometry and growth of the CNT from the catalytic nano-particle. That is, the growing CNT covers most of the catalyst. To grow a SWNT the nano-particle must be very small, approximately 1-10 nm in diameter. The presence of the growing CNT further reduces the available surface area. Furthermore, the absorption process itself causes the surface of the catalytic nano-particle to become encrusted with amorphous carbon and graphite which slows and eventually stops absorption of feedstock carbon and growth of the CNT. The effectiveness of the scrubber gas to clean the surface of the nano-particle is limited because the scrubber gas tends to attack the CNT necessitating a lower concentration of scrubber gas. The conventional process cannot be sustained indefinitely, which places a limit on the length of CNT growth. Likewise the growth rate in the conventional process is limited by the absorption rate and a viscous force produced by the process gases that opposes the extrusion force. Sustainability and growth rate will be important to commercialization of CNTs. In theory, the CNT structure is formed of pure carbon atoms. However, in the conventional process CNT growth in the presence of the impurities in the process gases can introduce contaminants into the CNT structure of 2% or more. Furthermore, the high-pressure noxious gas environment is not hospitable to in-situ annealing of defects using electron guns or in-situ observation of CNT growth using electron gun microscopes or optical sensors.

As we have discovered, many of these deficiencies are attributable to the noxious gases present in any CVD process and the fact that in conventional CVD, the catalytic surface at which absorption of carbon feedstock takes place and at which growth of the CNTs occurs are one and the same. The desired conditions for absorption of reactive carbon atoms into the catalytic material and for growth of CNTs in a CVD process are quite different.

The present invention addresses these deficiencies with a system and method for growing nanotubes using an ion implantation process that facilitates sustained growth of high quality nanotubes from an element selected from among Carbon (C), Germanium (Ge), Boron (B), Boron-Nitride (BN), Boron-Carbide (BC), $B_iC_jN_k$ where i, j and k are any non-negative integers, Silicon (Si) and Silicon-Carbide (SiC). Without loss of generality, in the exemplary case of carbon nanotubes (CNTs), a catalyst (an alloy of atoms such as Fe, Co and Ni atoms) is placed on or in a membrane that physically and possibly environmentally separates an implantation chamber from a growth chamber. The combination of catalyst and membrane may be referred to as the "catalytic transmembrane". Carbon ions are implanted into the catalytic material either directly or indirectly to grow a CNT on an opposing surface directly exposed to the growth chamber. Because ion implantation is performed in a vacuum, the environment is not hostile to the growth process and the chambers do not have to be environmentally separated.

Ion implantation via the membrane provides for greater flexibility to separate and independently control the implantation and growth processes. Specifically ion implantation eliminates the noxious gases and overcomes any encrusting problem in order to sustain growth; sufficiently high-energy ions penetrate through any encrustation. Use of the membrane to separate implantation from growth also prevents the ion beam from damaging the CNTs. Growth rates via direct implantation are expected to be considerably slower than CVD but sustainable and may be increased by indirect implantation via "knock on" or "sputtering" processes that amplify the number of carbon ions transferred into the catalyst. Ion implantation is a more precise and controllable process than CVD that facilitates closer spacing of CNTs in an array and control of CNT length. Furthermore, the ion implantation system is conducive to the introduction of diagnostic equipment such as electron guns and optical sensors in-situ to control defects in the growing CNT and observe the growth of the CNT as well as the membrane surface exposed to the implantation chamber. In-situ observation of CNT growth is particularly important to further the science of CNT growth.

As shown in FIGS. 4a-4b, the method of ion implantation uses a membrane 50 that physically and possibly environmentally separates a chamber 51 into an implantation region or chamber 52 (held at vacuum by a vacuum pump 53) from a growth region or chamber 54. A catalyst 56 (a 'nano-particle') including atoms 57 supported on or in membrane 50 provides an implantation surface 58 to receive carbon ions 62 with sufficient energy to reach, penetrate and stop in the catalyst and a growth surface 62 directly exposed to the growth region to grow carbon nanotubes 63. The catalyst or nano-particle is typically a single 3D particle containing an alloy of many atoms such as Fe, Co and Ni but could be multiple nano-particles of varying geometry and configurations. Note, the illustrations are not to scale; the membrane diameter is typically in the tens of millimeters while the nano-particle is at most tens of nanometers. In this embodiment, the membrane is supported along a portion of the walls of chamber 51 (not shown) to physically separate the implantation and growth chambers, one on either side of the membrane, but does not span the entire chamber to form an environmental seal between the two chambers. Consequently, the growth chamber is held at the same vacuum. The membrane could physically span the entire chamber and still not environmentally separate the two chambers if the membrane does not provide a seal. The key is that the membrane provides a region or chamber for performing ion implantation on one side and a region or chamber for growing nanotubes on the other.

In one embodiment shown in FIG. 4a, source 64 emits carbon ions in a carbon ion beam or an ionized hydrocarbon $H_xC_y$ beam that are implanted directly through membrane into catalyst 56. A second source 75 of dopant ions such as B or N can be provided to dope the CNT by replacing carbon atoms in the lattice with a dopant atom. The beam preferably implants the dopant ions into the catalyst but may be directed at the CNT. Doped CNTs can be used as nanodiodes and other nanoelectronic devices.

In another embodiment shown in FIG. 4b, source 64 directs an ion beam 65 onto a carbon-containing layer 66 such as graphite on the topside of the membrane. The knock-on layer may be formed from naturally occurring carbon that includes approximately 99% C12, 1% C13 and ≈0% C14 isotopes, a manufactured carbon including any specified isotope composition, or a filtered source of a substantially pure isotope. Through a "knock-on" process, each ion knocks multiple carbon ions 62 forward through the membrane into catalyst 56 providing gain. In this embodiment, ion beam 65 may be ionized carbon or some other ionized particle, heavier or lighter than carbon. The particle may be an ionized element such as Carbon, Argon or a heavy ion such as Kr, an ionized molecule such as $H_2O$ or an ionized hydrocarbon $H_xC_y$, as long as the particle can knock Carbon ions out of layer 66 with sufficient energy to penetrate and stop in the catalyst. The catalyst may be formed in the membrane to expose the implantation surface to the ion beam so that it is not required to penetrate through the membrane. The growth surface must be exposed to the growth chamber but the implantation surface may or may not be directly exposed to the ion beam in the implantation chamber. Unlike the thermal diffusion processes of CVD, the ion beam may penetrate through to the catalyst. The catalyst must still be hot so the thermal diffusion processes will extrude the CNT out of the particles surface. For intense ion beams this heat may be supplied by the beam but for lower beam intensities it must be supplied by an external heater. Once the injected carbon ions 62 slow down within the catalyst they recombine with electrons to form additional neutral carbon atoms 57 needed to initiate and sustain growth of the CNTs 63.

Figure 5A:
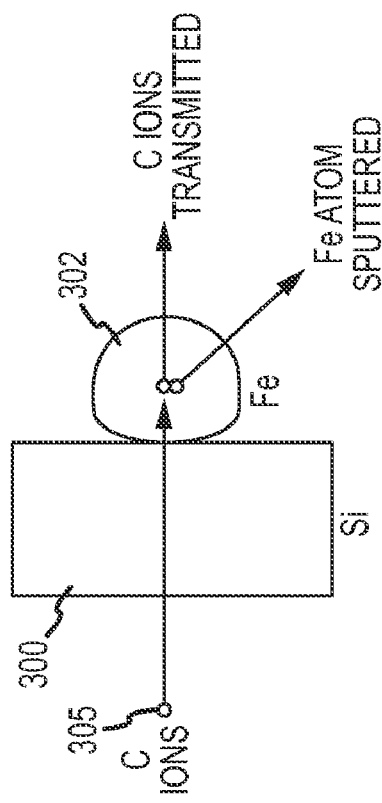
FIGS. 5a and 5b are a diagram of a simple membrane and catalyst configuration and a frequency plot of ion implantation depths.
Figure 5B:
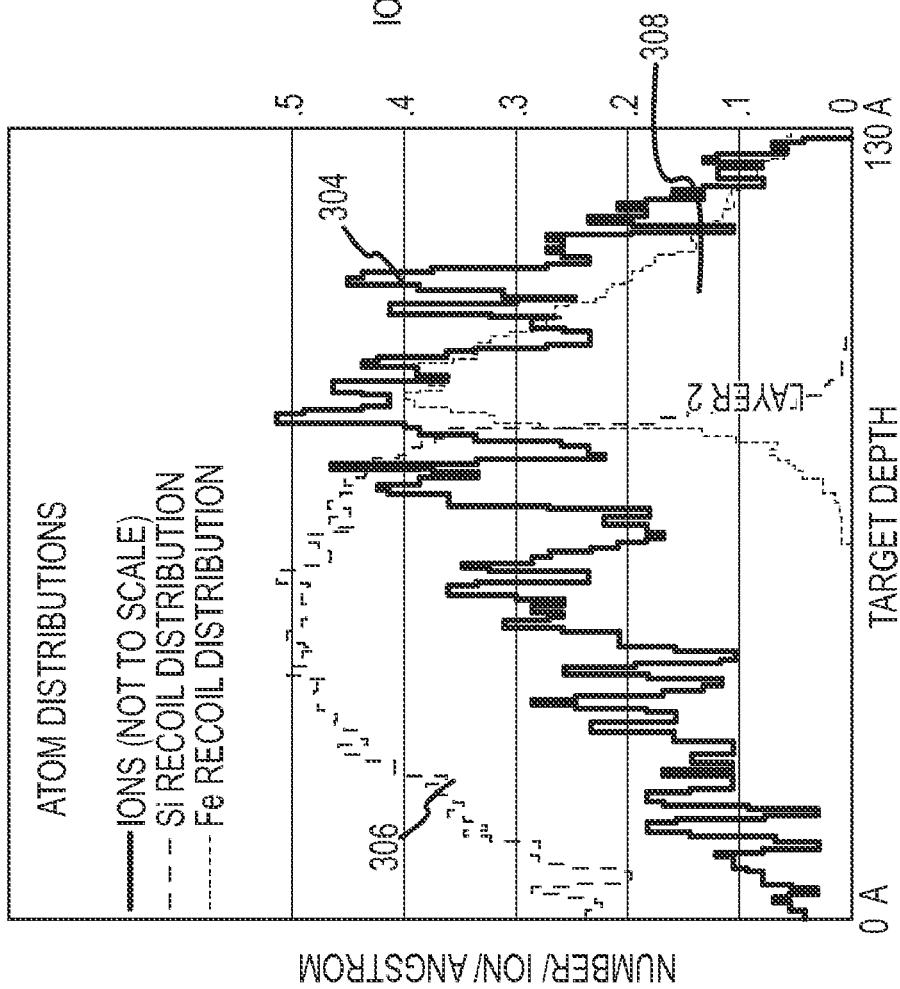

The viability of ion implantation through a membrane 300 into a catalyst 302 for a rudimentary design shown in FIG. 5a is confirmed by the plot 304 of the number of carbon ions versus implantation depth shown in FIG. 5b. In this example, a 5 nm sphere of Fe 302 is placed on the backside of an 8 nm Si membrane 300. This thickness is determined by the initial energy of the ion. A wide range is acceptable depending on the thickness of an anti-sputtering layer and a graphite enhancement carbon layer (not included in this simple example). It can run from at least 100 eV to 100 keV. This membrane can be $Al_2O_3$, Si, $SiO_2$ or any nonreactive material compatible with the catalyst. A graphite knock-on layer perhaps 5 nm to 100 nm is formed on the membrane. In this simulation, a 2 keV Carbon ion beam 305 is directed onto the membrane. As shown, a majority of the carbon ions are implanted within the 5 nm depth inside the sphere. A fair portion of the carbon ions are backscattered and absorbed in the Silicon membrane and some of the carbon ions pass through the structure entirely. The ion bombardment scatters Si ions 306 that are substantially reabsorbed in the Si membrane. Similarly Fe ions 308 are scattered but substantially reabsorbed in the catalyst. These results demonstrate that ion implantation through a membrane with a knock-on process to amplify the carbon implantation is feasible to initiate CNT growth.

Figure 6:
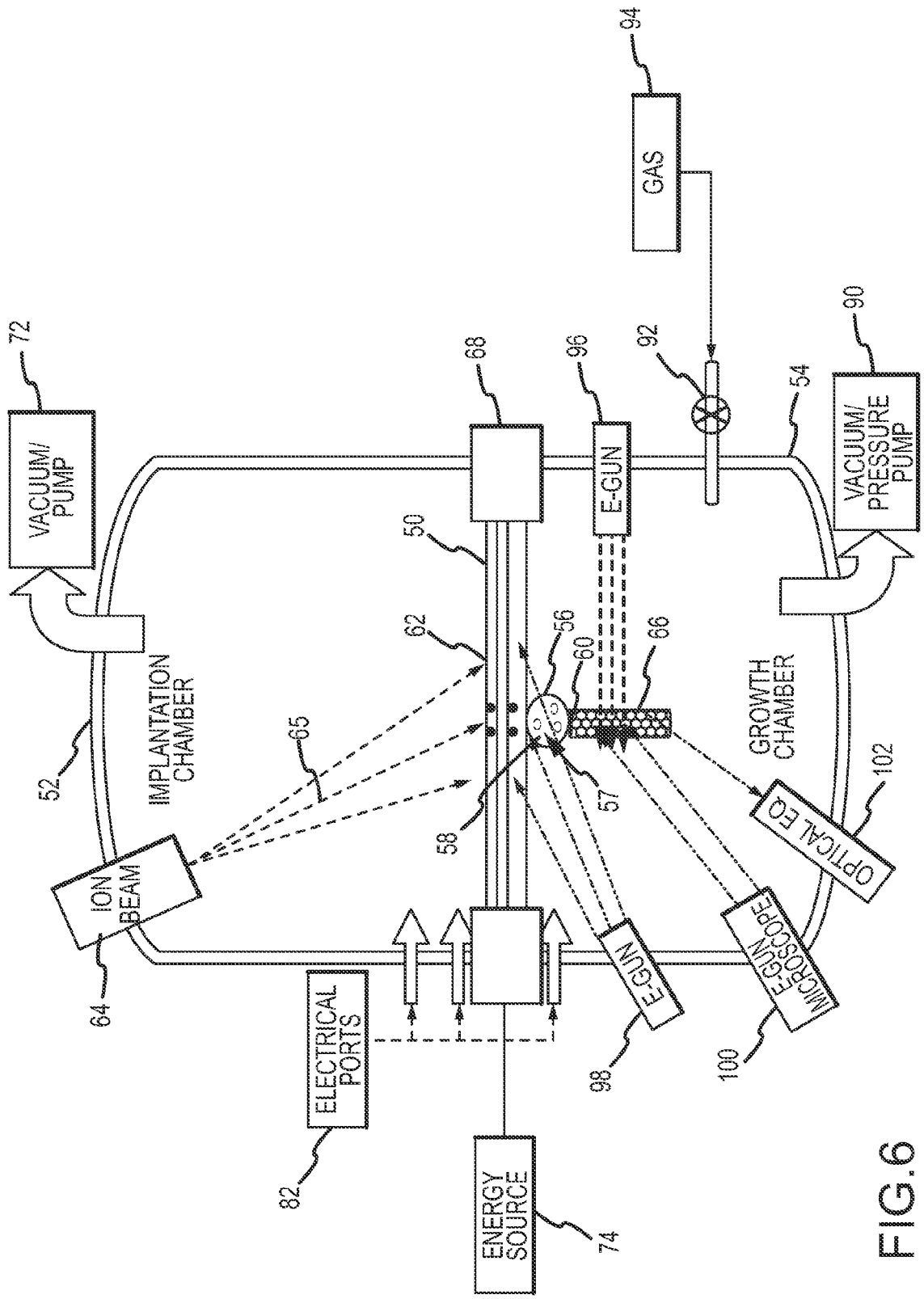
FIG. 6 is a diagram of an embodiment of the ion implantation process using a membrane to separate the implantation and growth chambers in accordance with the present invention.
Figure 7:
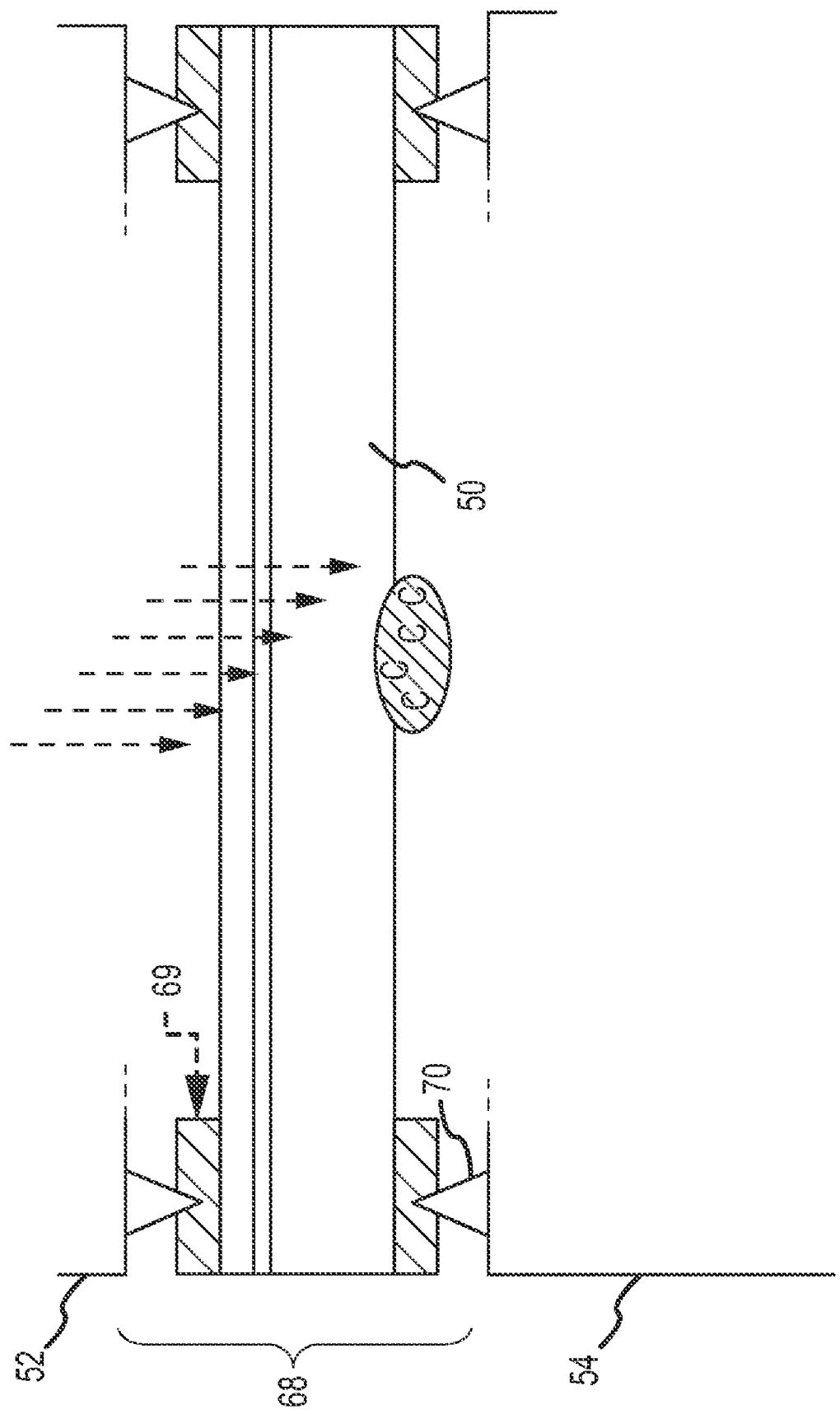
FIG. 7 is a diagram of an exemplary embodiment of a gasket that seals the implantation and growth chambers from the external environment and each other.

Another embodiment of a system for ion implantation synthesis of CNTs is illustrated in FIG. 6. Membrane 50 including an insulating layer 71, suitably Si or $SiO_2$, knock-on layer 66 and an anti-sputtering layer 73 separates implantation chamber 52 from growth chamber 54. A gasket 68 holds membrane 50 in place and environmentally seals the implantation and growth chambers from each other and the external environment. As described in FIG. 4, sealing the two chambers is not essential. It provides an additional degree of freedom to control the environment in the growth chamber. As shown in FIG. 7, in one embodiment gasket 68 includes a soft gold ring 69 on opposite sides and along the periphery of the membrane and conflat (CF) vacuum flanges, knife edge (304 SS) 70 on opposing laces of the implantation and growth chambers 52, 54. The CF vacuum flanges 70 engage the soft gold rings 69 to form the requisite seals. Other gasket configurations are possible as well. This allows the environments, namely the gas compositions and pressure, to be independently controllable. Given the 'thinness' of the membrane the differential pressure cannot be allowed to get too high. The membranes currently being tested are specified to withstand a differential pressure of up to 1 atmosphere (760 Torr). In many applications separately controllable environments may not be desirable; hence the gasket is not required.

An implantation environmental control system includes a pump system including a vacuum pump 72 to control the pressure of the implantation chamber and possibly an energy source 74 to heat the catalytic material. If the energy of the ion beam is sufficiently high, the beam will self-heat the catalytic material such that a separate energy source is not required. A number of electrical ports 82 are provided to accommodate pressure sensors, thermocouples and the like to monitor conditions inside both chambers.

Because the CNT is not grown inside implantation chamber 52, the ion implantation process can be tailored for more efficient implantation and growth control. Specifically, the use of "knock-on" processes is facilitated by implanting ions from one side of the catalyst to grow CNTs on the other side. The implantation surface is not obstructed by the growth of the CNT. The ion beam will not attack the CNT itself. Furthermore, since ion implantation is performed in a vacuum, the environment is hospitable to the introduction of diagnostic equipment in the implantation chamber to study the membrane and implantation surface.

A growth environmental control system includes a pump system 90 including a vacuum and/or pressure pump to control the pressure of growth chamber 54 and possibly one or more gas feeds 92 to introduce a gas 94 such as an inert gas or possibly functionalizing gases for attaching doping materials to CNTs to modify or enhance their mechanical, electrical, optical, or chemical properties for further processing into electronic or sensor devices. Eliminating the hot noxious gases associated with conventional CVD processes, particularly the carbon-containing growth gas, from the growth chamber has several benefits. First, these gases tend to attack and contaminate the CNT as it grows. Second, electron guns 96 and 98 can be used in-situ to selectively fix and create defects in the CNT as it grows. Electron gun 96 can be used to anneal defects in the NT structure to provide missing carbon atoms. Electron gun 98 can be used, for example, to rotate pairs of common atoms to move the bonds and change the bond structure of the CNT. Lastly, the environment facilitates in-situ observation of the growth process using, for example, an electron microscope 100 and optical equipment 102 for Raman spectroscopy, fluorescent spectroscopy or other appropriate measurements. The electron guns and observation equipment are suitably located outside the chamber and routed through ports in the chamber.

The growth chamber may be operated in a vacuum or gases may be introduced and the pressure controlled to be nearer atmospheric pressure. Pure vacuum is 0 Torr, less than $10^{-6}$ is considered to be ultra-high vacuum and less than $10^{-2}$ Torr a good vacuum. The implantation chamber is maintained at "vacuum" which is to be considered at least a good vacuum and preferably ultra-high vacuum for ion implantation. Vacuum conditions may provide an optimal environment for carbon growth and for use of the electron guns. Alternately, an inert gas can be introduced into the growth chamber.

For simplicity of explanation, the membrane has been described as supporting a single catalyst or nano-particle. For purposes of scientific research and some commercial applications it may be desirable to grow a single CNT. In other cases, it may be desirable to grow an array of CNTs and in some cases a very large array, perhaps upwards to billions of separate NTs in a single structure. The membrane is well suited for either single CNTs or arrays of CNTs. The array of catalysts can be fabricated on or in the membrane use using standard processing techniques. This allows for control over the geometry of the nano-particle and particularly the geometry of the absorption and growth surfaces.

In one embodiment as shown in FIG. 8 membrane 50 includes a relatively thick substrate 110 formed of a materially such as Si, $SiO_2$, or $Al_2O_3$ that is chemically inactive to the nanotube material. The substrate should be sufficiently strong to handle any pressure gradients between the chambers and exhibit thermal expansion properties close to the catalytic material. Substrate 110 is patterned and a catalyst 112 is deposited to form an array. A spacer layer 113 separates a knock on layer 114 (e.g. Graphite) from the catalyst material. An anti-sputtering layer 116 (e.g. Ti, Mo, etc.) is deposited over the knock-on layer. A source directs an ion beam 118 through the anti-sputtering layer onto knock-on layer 114. Through a "knock-on" process, each ion knocks multiple carbon ions 119 forward through the membrane into catalyst 112 thereby providing gain. The implanted carbon ions become neutral carbon atoms and grow CNTS 120. Carbon ions that are knocked backward from layer 114 are captured by the anti-sputtering layer 116. In this example, membrane 50 is placed in a vacuum chamber 122. The membrane physically divides the chamber into an ion implantation chamber on one side and a growth chamber on the other but both chambers are held at vacuum in the same environment. Other membrane configurations that provide the requisite functionality of separating and possibly sealing the implantation and growth chambers and providing different catalytic surfaces for implantation and growth are contemplated by the current invention.

As described above, an energy source is used to heat the catalytic material to maintain the temperature needed for diffusion through the catalytic material. As shown in FIGS. 9a and 9b, provision of an electrical current 126 through a resistive heater strip 128 patterned around the individual nano-particles 112 on substrate 110 can maintain the membrane at a constant temperature. The integrated heater strip may be more effective at maintaining the entire array of nano-particles at the desired temperature. One of the electron guns in the growth chamber can locally heat the growth region so that growth is stimulated.

In another embodiment shown in FIG. 10, a catalyst 130 is embedded in membrane 132 so that a portion 134 of catalyst surface is directly exposed to the implantation chamber and a different portion 136 of catalyst surface is directly exposed to the growth chamber. A carbon ion beam 138 is directed onto portion 134 to directly implant carbon ions 140 into catalyst 130 to grow CNTs 142 on the portion 136 of the catalyst surface exposed to the growth chamber. Note, portion 134 could be covered by a non-carbon containing layer and still achieve direct implantation without knock-on processes. In this example, membrane 132 is placed in a vacuum chamber 144. The membrane physically divides the chamber into an ion implantation chamber on one side and a growth chamber on the other but both chambers are held at vacuum in the same environment.

Figure 11A:
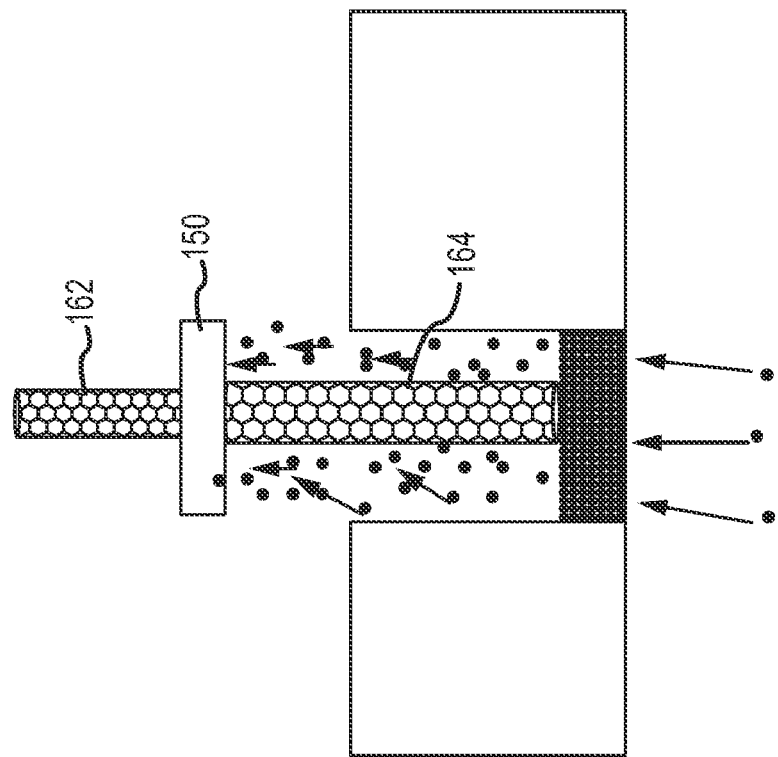
FIGS. 11a and 11b are sections views of an alternate embodiment of the membrane to facilitate a "lift-off" growth process.
Figure 11B:
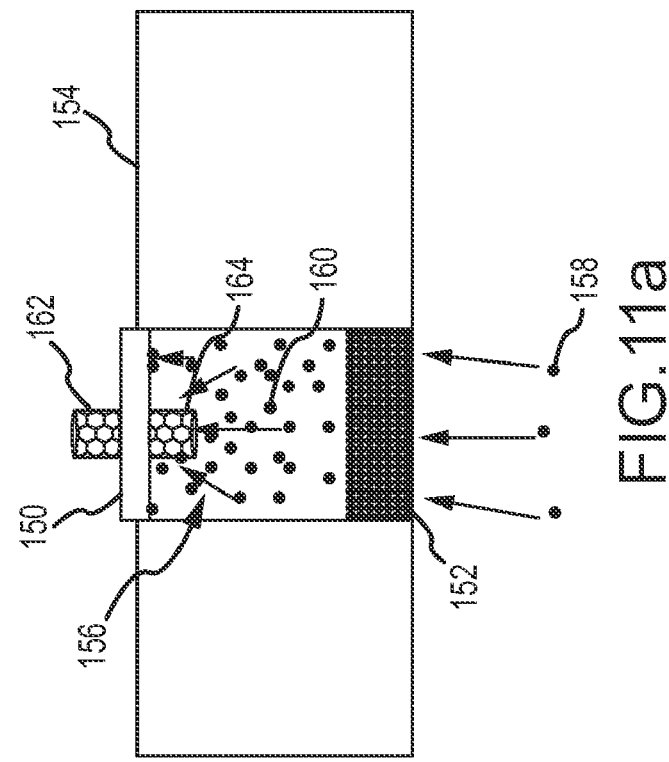

In another embodiment depicted in FIGS. 11a and 11b, a catalyst 150 and a knock-on material 152 are formed on opposite sides of a membrane 154 separated by an air gap 156. Ions 158 from a source strike knock-on material 152 ejecting carbon ions 160 that reach, penetrate and stop in catalyst 150. A pair of CNTs 162 and 164 grow in opposite directions from the catalyst. When CNT 164 reaches the knock-on material 152 the growth process serves to "lift-off" catalyst 150 from the membrane.

Figure 12A:
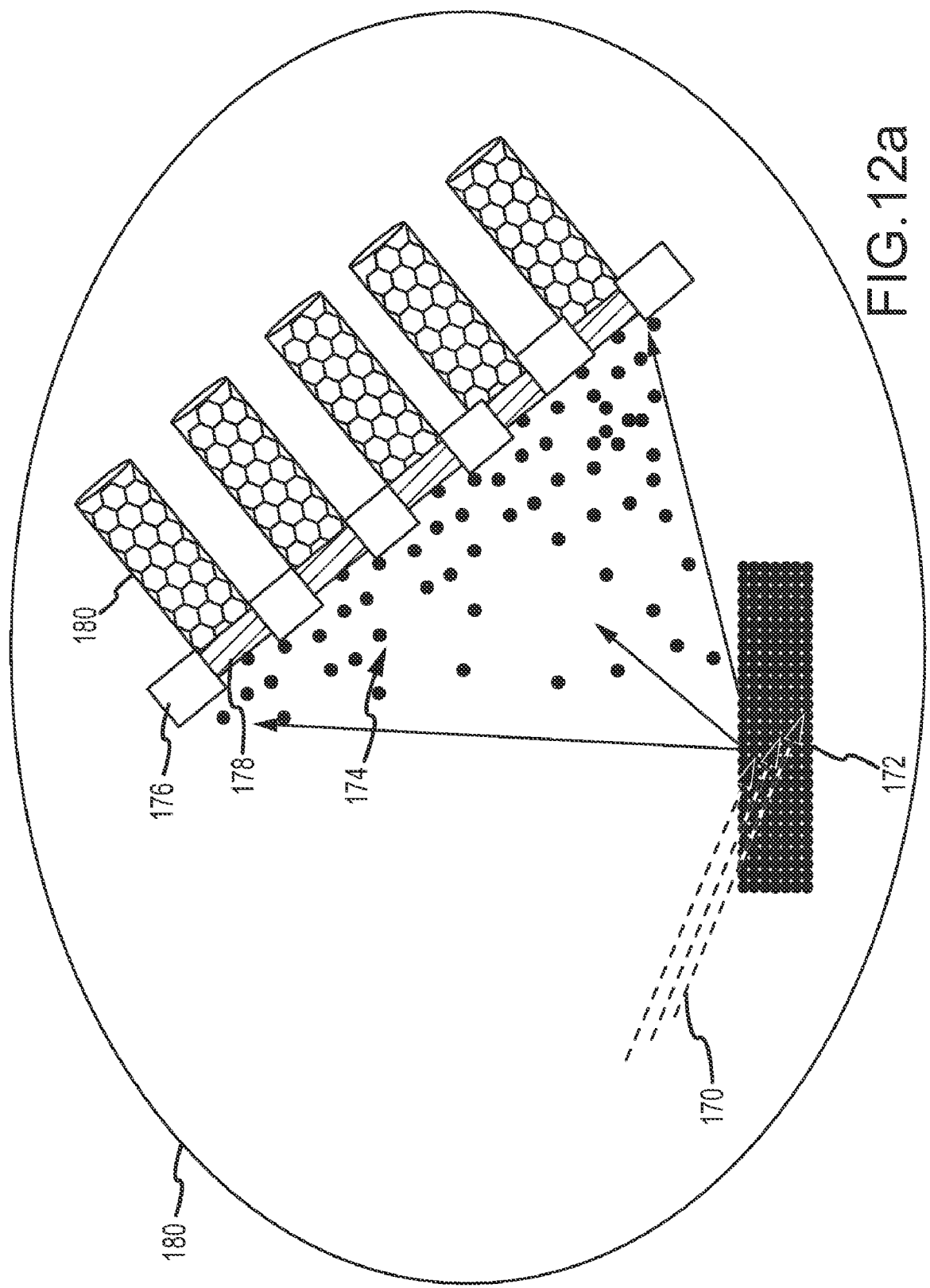
Figure 12C:
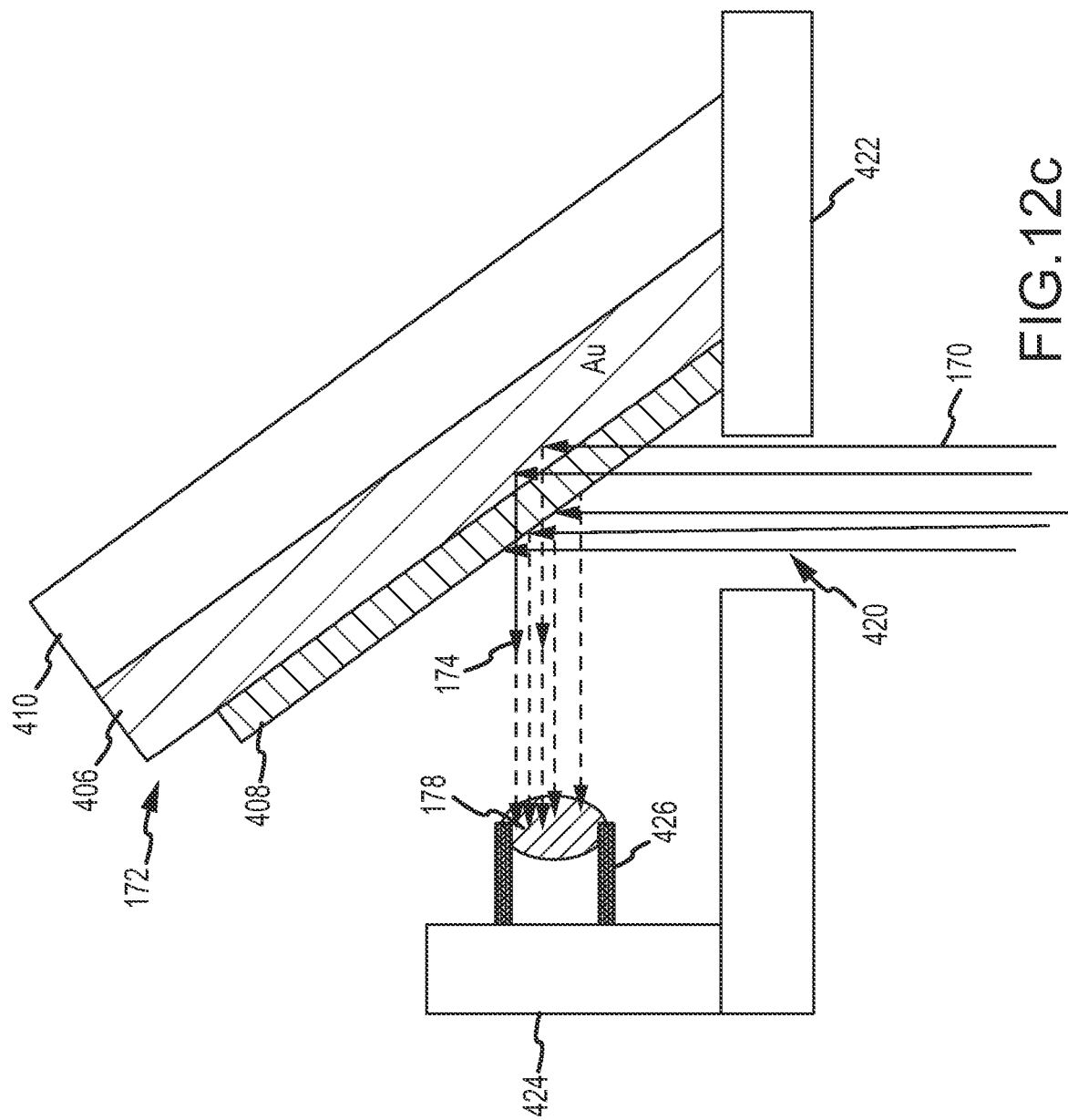

In another embodiment illustrated in FIGS. 12a-12c, an ion beam sputters carbon ions from a target that back scatter onto a catalyst or catalysts. As shown in FIG. 12a, an ion beam 170 is directed at a target 172 comprised of carbon-containing atoms such as Graphite to "sputter" carbon ions 174 from the target. The sputtered carbon ions 174 are back scattered onto the backside of a membrane 176 formed with an array of catalysts 178. The carbon ions are implanted in the catalysts causing CNTs 180 to grow on the front side of the membrane. In this example, membrane 176 is placed in a vacuum chamber 180. The membrane physically divides the chamber into an ion implantation chamber on one side and a growth chamber on the other but both chambers are held at vacuum in the same environment. In an alternate geometry, ion beam 170 is directed through an aperture 400 (a thin layer 402 or a hole) in a membrane 404 onto target 172 comprising a gold layer 406 and a graphite layer 408 on a silicon substrate 410. The sputtered carbon ions 174 are backscattered onto catalysts 178 on the front side of membrane 404. Thin layer 402 may be a knock on layer to enhance the carbon flux. The thickness of the graphite and gold layers as well as the ion energy of the beam can be adjusted to achieve the required implant energy for different catalysts thicknesses. This structure can repeat laterally to grow a larger array. In another geometry, beam 170 is directed through an aperture 420 in a substrate 422 onto a target 172 comprising a gold layer 406 and a graphite layer 408 on a silicon substrate 410 at an angle to the beam. The sputtered carbon ions 174 are back scattered onto a catalysts 178 on aside wall 424 shown here after lift-off growth of the CNT 426 has begun. In this geometry, the CNT is not directly exposed to the ion beam.

Figure 13:
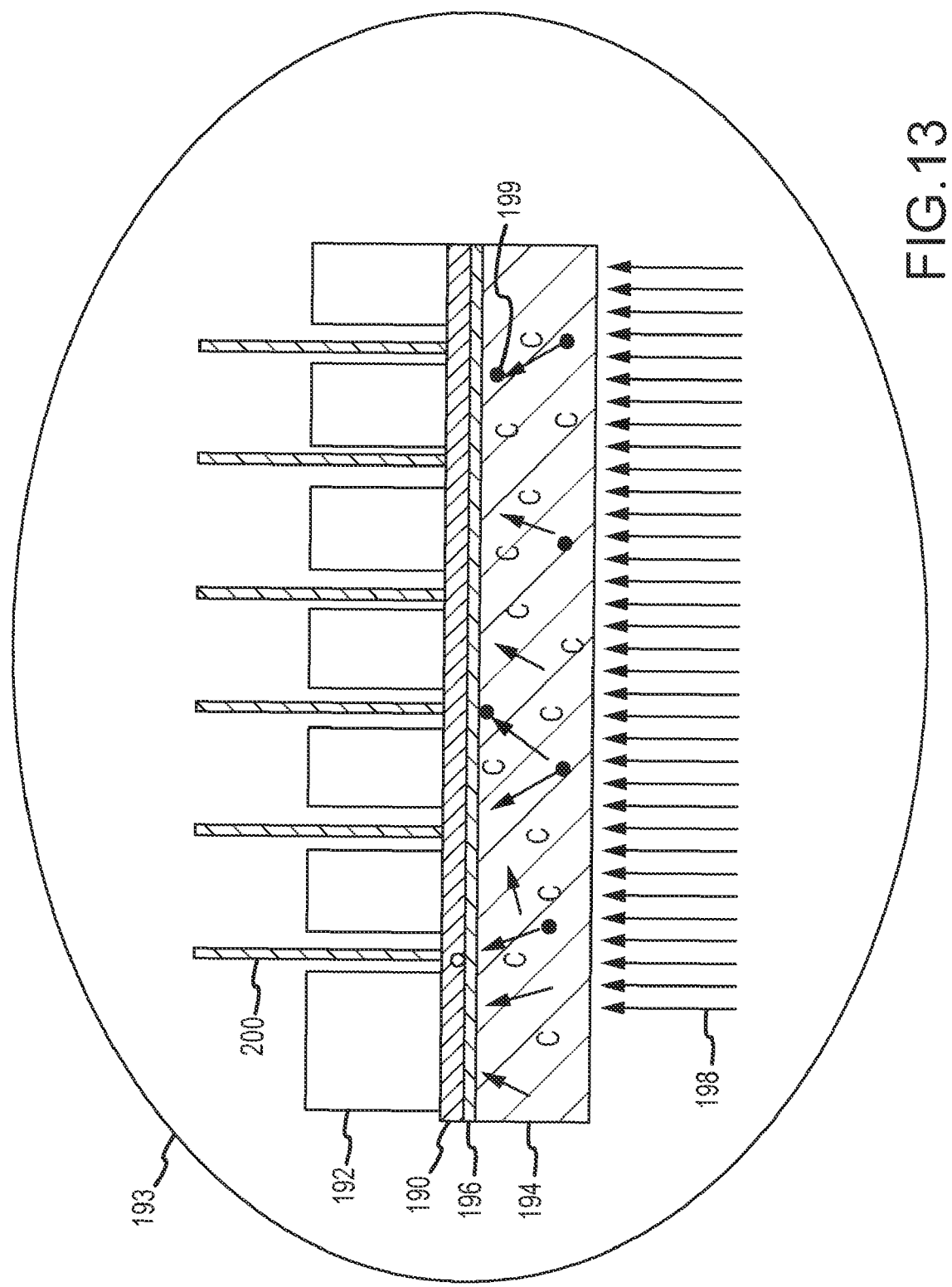
FIG. 13 is a section view of an alternate embodiment of the membrane for growing an array of nanotubes from a sheet of catalytic material.

In another embodiment illustrated in FIG. 13, a continuous layer 190 of catalytic material is formed on the backside of a patterned membrane 192 in vacuum chamber 193. A knock-on layer 194 is separated from the catalytic layer by a spacer layer 196. Patterned membrane 192 exposes defined portions of the catalyst layer to the growth environment. Ions 198 from a source strike knock-on layer 194 ejecting carbon ions 199 that reach, penetrate and stop in catalyst layer 190 causing CNTs 200 to grow on the exposed portions of the catalyst surface.

Figure 14:
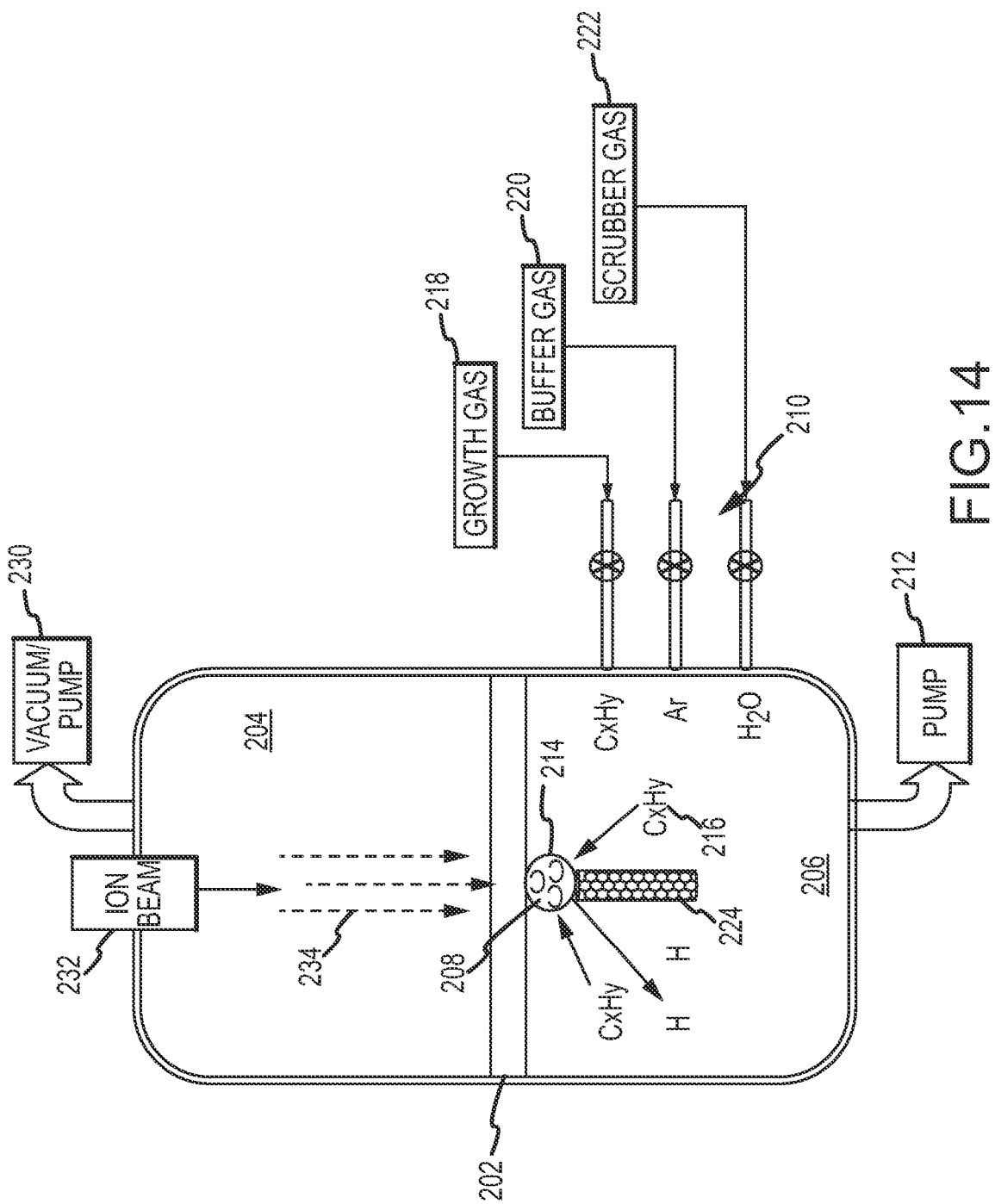
FIG. 14 is a diagram of a hybrid CVD and ion implantation process for growing nanotubes.

In another embodiment illustrated in FIG. 14, a hybrid CVD-ion implantation process is used to grow CNTs. Even with the use of knock-on processes, CNT growth via ion implantation may be slower than conventional CVD. The use of a membrane 202 to both separate and environmentally seal an implantation chamber 204 from a feedstock/growth chamber 206 facilitates a hybrid growth process. A catalyst 208 is placed on the underside of membrane 202 exposed to the feedstock/growth chamber.

A feedstock system includes gas feeds 210 to introduce process gases into the feedstock/growth chamber 206, a pump system 212 including a vacuum and/or pressure pump to control the pressure of the chamber, and an energy source to heat the gases and/or catalytic material to separate carbon atoms 214 from the growth gas molecules 216 for absorption into the catalytic material. The process gas typically includes a mixture of a carbon-containing growth gas 218, typically a hydrocarbon $C_xH_y$ such as Ethylene ($C_2H_4$), Methane ($CH_4$), Acetylene ($C_2H_2$) or Ethanol ($C_2H_5OH$) or possibly a non-hydrocarbon such as carbon-monoxide (CO), a buffer gas 220 such as an inert gas, e.g. Argon (Ar), to control pressure inside the chamber and prevent released hydrogen atoms from exploding, and possibly a scrubber gas 222 such as $H_2O$ or $O_2$ to periodically clean the surface of the catalyst. In some applications the buffer and or scrubber gases may not be required. The carbon atoms 214 are absorbed into catalyst 208 to grow CNTs 224 in the feedstock/growth chamber. Even with the scrubber gas, over time the catalyst becomes encrusted with amorphous carbon and graphite which slows and eventually stops absorption of feedstock carbon and growth of the CNT At this point, the CVD process is suspended and the ion implantation process is militated. A vacuum pump 230 maintains a vacuum in the implantation chamber so that a source 232 can direct an ion beam 234 onto membrane 202 to implant carbon ions into catalyst 208 to sustain CNT growth albeit at a slower growth rate. The carbon ions can be implanted either directly or via knock-on processes. This approach combines the high initial growth rate of a CVD process with the sustainability of an ion implantation process. Notice that if a crust of carbon builds up on the catalytic particle, the ion energy can be increased to penetrate through the crust into the catalyst. Carbon build up would normally stop growth for the standard CVD method. This can be a real advantage over CVD growth.

Figure 15:
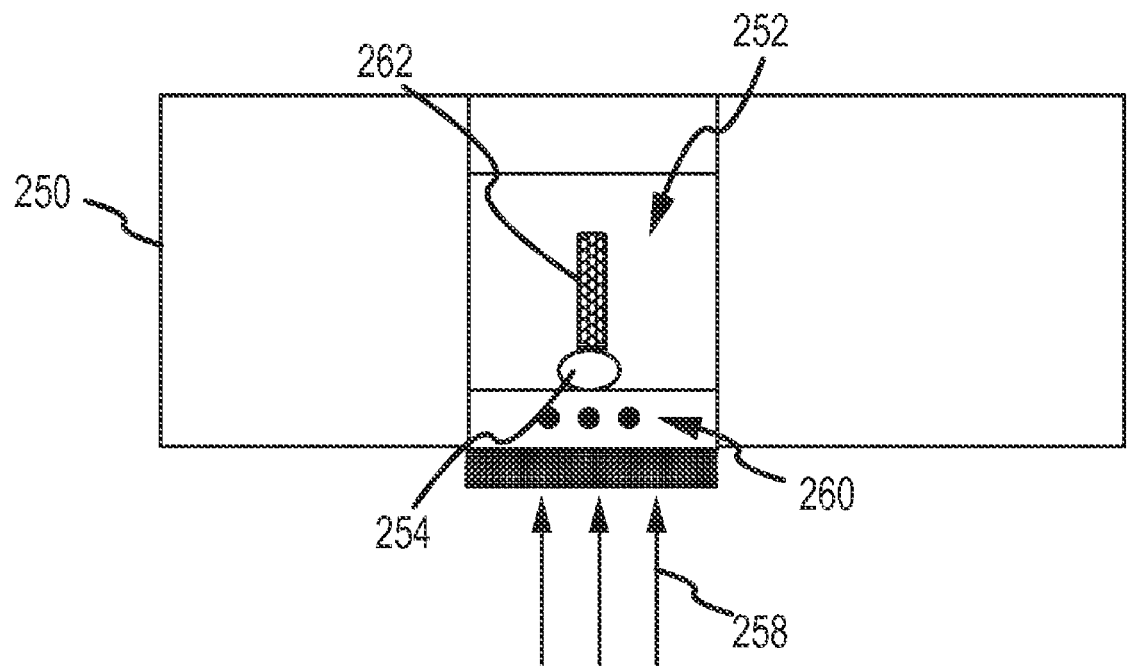
FIG. 15 is a diagram of an alternate embodiment for growing CNTs in a closed-cavity.

In another embodiment depicted in FIG. 15, a membrane 250 is constructed to provide a closed cavity 252. A catalyst 254 is placed inside the cavity and a knock-on material 256 is suitably placed outside the cavity opposite the catalyst. Ions 258 from a source strike knock-on material 256 ejecting carbon ions 260 that reach, penetrate and stop in catalyst 254 causing a CNT 262 to grow within the closed cavity.

Although the description of the invention has focused on the growth of carbon nanotubes the approach is viable for growing nanotubes from other materials such as Germanium (Ge), Boron (B), Boron-Nitride (BN), Boron-Carbide (BC), $B_iC_jN_k$, Silicon (Si) or Silicon-Carbon (SiC). The interest in and development of carbon nanotube technology is well beyond that of other materials, hence the focus on carbon nanotubes. However, the approach of using a catalytic membrane to separate the implantation and growth chambers is just as applicable for growing nanotubes from these other discovered or yet to be discovered materials.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An apparatus for growing nanotubes from an element selected from among Carbon, Germanium, Boron, Boron-Nitride, Boron-Carbide, $B_iC_jN_k$, Silicon and Silicon-Carbide, comprising:
    a chamber;
    a membrane physically separating said chamber into an implantation region and a growth region;
    one or more catalysts supported on the membrane, each said catalyst having a first portion of catalyst surface towards the implantation region and a different second portion of catalyst surface directly exposed to the growth region;
    a pump for holding at least said implantation region at vacuum; and
    a source configured to direct ions through the implantation region onto the membrane to implant element ions through the first portion of catalyst surface into the catalyst to grow element nanotubes on the second portion of catalyst surface in the growth region.

2. The apparatus of claim 1, wherein the source emits element ions that are directly implanted through the first portion of catalyst surface into the catalyst.

3. The apparatus of claim 1, wherein said membrane comprises an element containing layer between the catalyst and the implantation region and separated from the catalyst, said source emitting ions into said element-containing layer that releases a larger number of element ions that are implanted through the first portion of catalyst surface into the catalyst.

4. The apparatus of claim 3, wherein said catalyst is selected from iron (Fe), cobalt (Co), or nickel (Ni) and said element-containing layer is Graphite.

5. The apparatus of claim 3, wherein said source emits element ions.

6. The apparatus of claim 3, wherein said source emits ions of a different element or molecule than the element grown into said nanotube.

7. The apparatus of claim 6, wherein said different element or molecule has a higher molecular weight than said element grown into said nanotube.

8. The apparatus of claim 3, wherein the catalyst is separated by open space from the element-containing layer.

9. The apparatus of claim 3, wherein the element-containing layer releases the element ions forward into the catalyst through knock-on processes.

10. The apparatus of claim 3, wherein the element-containing layer back scatters the element ions into the catalyst through a sputtering process.

11. The apparatus of claim 1, further comprising:
    a dopant source configured to direct dopant ions into the catalyst to replace element atoms in the nanotube lattice.

12. The apparatus of claim 1, wherein the membrane physically separates but does not environmentally seal the growth and implantation regions from each other so that said pump holds both said implantation and growth regions at vacuum.

13. The apparatus of claim 1, wherein the membrane physically separates and seals the growth and implantation regions from each other, wherein said pump holds only said implantation region at vacuum, further comprising:
    a second pump to control the pressure of the growth region; and
    one or more gas feeds to introduce gases into the growth region.

14. The apparatus of claim 13, wherein said gas feeds introduce an element-containing gas into the growth region such that neutral element atoms are absorbed at said second different portion of catalyst surface to initiate nanotube growth via a CVD process, said source emitting ions to implant element ions into said first portion of catalyst surface to sustain nanotube growth via the ion implantation process.

15. The apparatus of claim 1, further comprising:
- a first piece of diagnostic equipment in the implantation region to characterize surface properties of the membrane; and
- a second piece of diagnostic equipment in said growth region to characterize properties of the nanotube.

16. The apparatus of claim 1, wherein the geometry of the first portion of the catalyst surface is configured for efficient implantation of element ions into the catalyst and the geometry of the second different portions of the catalyst surface is configured to grow carbon nanotubes with a specified geometry.

17. The apparatus of claim 1, wherein said membrane supports an array of catalysts to grow an array of carbon nanotubes in said growth region.

18. An apparatus for growing carbon nanotubes (CNTs), comprising:
- a chamber;
- a membrane physically separating said chamber into an implantation region and a growth region;
- a plurality catalysts supported on the membrane, each said catalyst having a first portion of catalyst surface towards the implantation region and a different second portion of catalyst surface directly exposed to the growth region;
- a carbon-containing layer supported on the membrane towards the implantation region and separated from the first portion of catalyst surface;
- a pump for holding at least said implantation region at vacuum; and
- a source configured to direct ions through the implantation region onto the carbon-containing layer causing the layer to release a larger number of carbon ions through knock-on processes forward to implant those carbons ions through the first portion of catalyst surface into the catalyst to grow carbon nanotubes on the second portion of catalyst surface in the growth region.

* * * * *

UNITED STATES PATENT AND TRADEMARK OFFICE
CERTIFICATE OF CORRECTION

PATENT NO.         : 7,883,580 B2                                    Page 1 of 1
APPLICATION NO.    : 12/061317
DATED              : February 8, 2011
INVENTOR(S)        : Barker et al.

It is certified that error appears in the above-identified patent and that said Letters Patent is hereby corrected as shown below:

On the title page, item [73], the assignee name should read "Raytheon Company" instead of "Raythedn Company."

Signed and Sealed this
Twenty-second Day of March, 2011

David J. Kappos
*Director of the United States Patent and Trademark Office*